(12) United States Patent
Metz

(10) Patent No.: US 7,251,852 B2
(45) Date of Patent: Aug. 7, 2007

(54) WIPER SYSTEM

(75) Inventor: Ulrich Metz, Achern (DE)

(73) Assignee: Robert Bosch GmbH, Stuttgart (DE)

( * ) Notice: Subject to any disclaimer, the term of this patent is extended or adjusted under 35 U.S.C. 154(b) by 615 days.

(21) Appl. No.: 10/433,549

(22) PCT Filed: Jun. 26, 2002

(86) PCT No.: PCT/DE02/02326

§ 371 (c)(1),
(2), (4) Date: Oct. 7, 2003

(87) PCT Pub. No.: WO03/035440

PCT Pub. Date: May 1, 2003

(65) Prior Publication Data

US 2004/0049875 A1 Mar. 18, 2004

(30) Foreign Application Priority Data

Oct. 5, 2001 (DE) .................. 101 49 218

(51) Int. Cl.
B60S 1/18 (2006.01)
B60S 1/24 (2006.01)
B60S 1/06 (2006.01)

(52) U.S. Cl. .................. 15/250.21; 15/250.31; 15/250.27; 15/250.3; 15/250.23

(58) Field of Classification Search .............. 15/250.3, 15/250.31, 250.27, 250.21, 250.23
See application file for complete search history.

(56) References Cited

U.S. PATENT DOCUMENTS 3,829,924 A * 8/1974 Dittrich et al. .......... 15/250.14
4,584,734 A * 4/1986 Leroy et al. ............. 15/250.21
4,720,885 A 1/1988 Leroy
5,441,227 A 8/1995 Hayashi
6,216,309 B1 4/2001 Goto et al.
6,308,372 B1 10/2001 Abe

FOREIGN PATENT DOCUMENTS

| | | |
|---|---|---|
| DE | 44 44 066 A | 6/1996 |
| DE | 199 34 869 A1 | 2/2001 |
| DE | 199 40 815 A1 | 3/2001 |
| EP | 0 382 346 A | 8/1990 |

* cited by examiner

Primary Examiner—Gary K. Graham
(74) Attorney, Agent, or Firm—Michael J. Striker

(57) ABSTRACT

The invention is based on a wiper system (10) having a mounting plate (12), on whose mounting plate tube (14) a wiper bearing (20) is disposed on one end and a cast part (16) is disposed on the other, and a first bearing housing (22) for a second drive shaft (26) and a second bearing housing (28) for a control shaft (30) of a four-bar lever linkage are integrated with the cast part, and the second drive shaft (26) is driven by a wiper motor (32) via a motor crank (36), a drive element (44), and a bearing rocker (46). It is proposed that the wiper motor (32) is disposed as a reversing motor on the passenger side, and its motor shaft (34) is disposed on the cast part (16) in the vicinity of the second drive shaft (26), between the second drive shaft (26) and the control shaft (30), and the drive element (44) is embodied as a coupling plate.

6 Claims, 4 Drawing Sheets

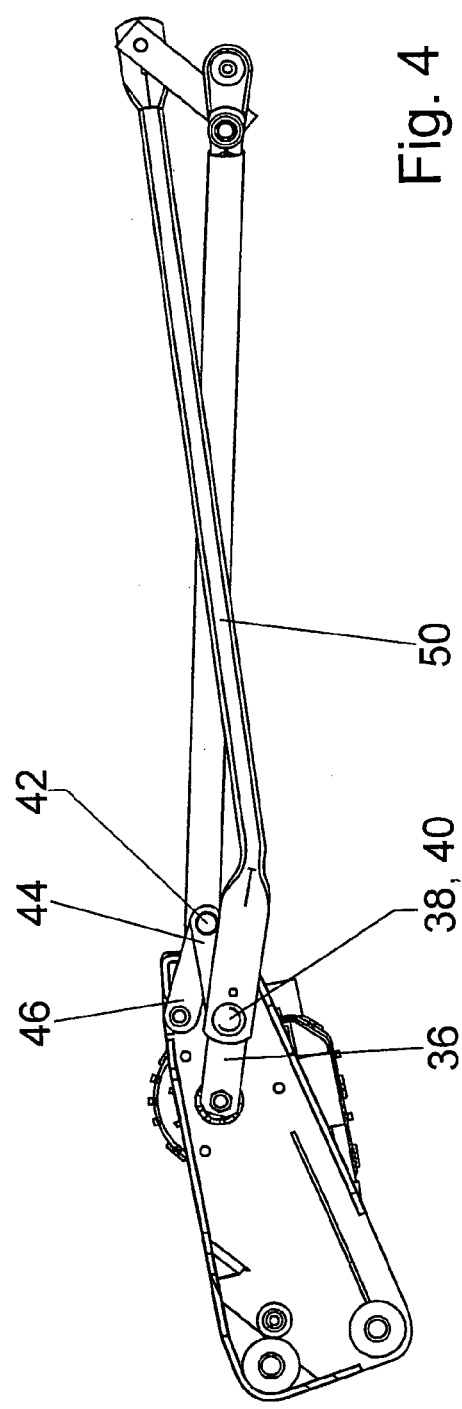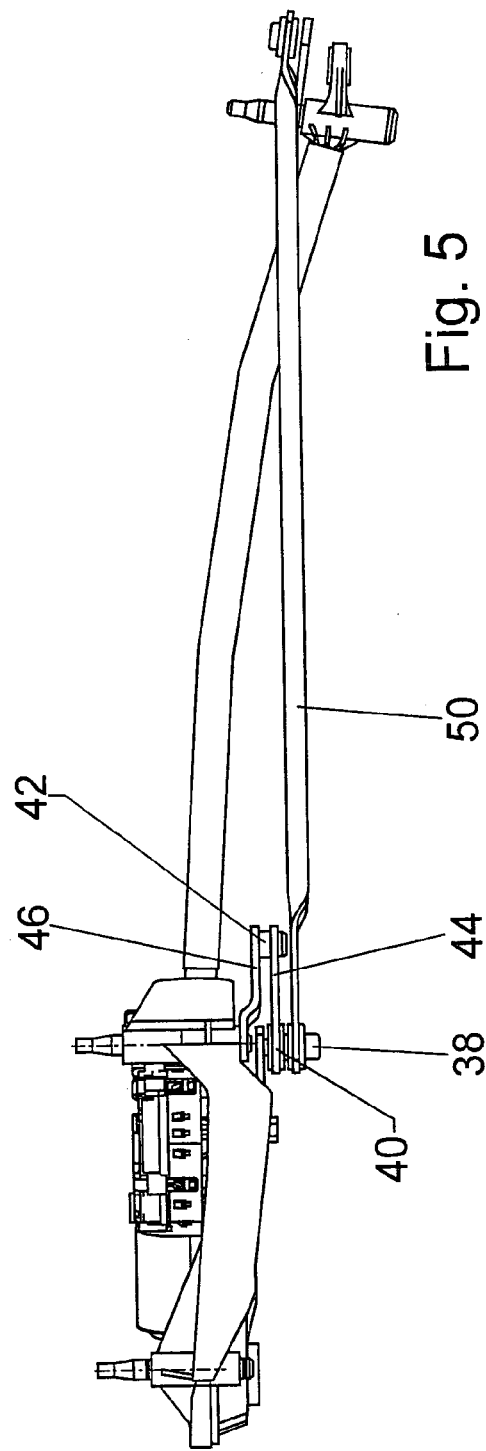

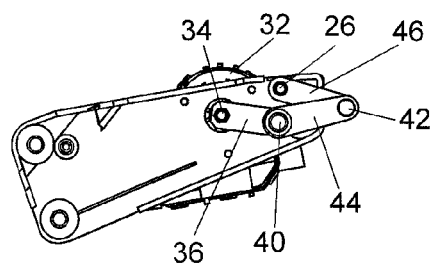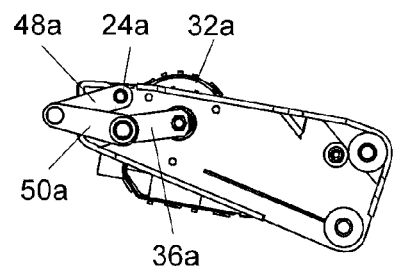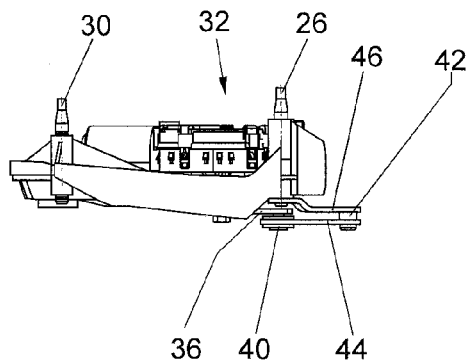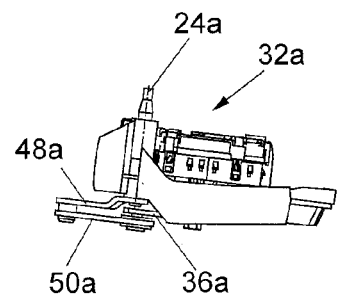
Fig. 6
Fig. 7

WIPER SYSTEM

CROSS-REFERENCE

The invention described and claimed hereinbelow is also described in PCT/DE 02/02326, filed on Jun. 26, 2002 and DE 101 49 218.9, filed Oct. 5, 2001. This German Patent Application, provides the basis for a claim of priority of invention under 35 U.S.C. 119 (a)-(d).

BACKGROUND OF THE INVENTION

The invention is based on a wiper system.

Motor vehicle wiper systems with more than one windshield wiper are secured with their wiper bearings directly or indirectly via a mounting plate to the vehicle body. The mounting plate—or tubular mounting plate, if the wiper carrier also includes tubular hollow profiles—includes a motor mounting plate that carries a wiper drive mechanism with a wiper motor. A power takeoff shaft of the wiper motor, via a motor crank and joint rods, drives further cranks, which are solidly connected to a drive shaft for each wiper. The drive shafts are supported in wiper bearings, whose bearing housings are disposed on the ends of the mounting plate.

If two wipers that sweep in the same direction are provided on the vehicle, then as a rule the wiper on the driver's side is driven by the motor crank via a joint rod pivotably connected to it, and by a further crank, while the wiper on the passenger side is driven via a four-bar lever linkage with a four-bar wiper lever. The four-bar lever linkage, whose kinematics bring about a combined reciprocating-pivoting motion of the wiper, adapts the swept field of the wiper to the trapezoidal shape of the windshield. The four-bar lever linkage includes a drive lever, seated on a drive axle, and a connecting rod that is pivotably supported about a control shaft. The free ends of the connecting rod and the drive lever are pivotably connected to a coupling element, the four-bar wiper lever. For some applications, the drive lever is embodied as a transversely jointed linkage.

As a rule, the connecting rod and the drive lever are firmly seated on the control shaft and the drive shaft, respectively, which are each rotatably supported in a bearing, with spacing from one another, in a cast part of the mounting plate. The cast part is joined via a mounting plate tube to a bearing housing of a wiper bearing on the passenger side. As a rule, a motor mounting plate for receiving a wiper motor is secured to the mounting plate tube.

The wipers are driven either by a revolving or a reversing wiper motor; either one wiper motor can be assigned to each wiper, or one wiper motor can drive a plurality of wipers in common. From German Patent Disclosure DE 199 34 869 A1, a wiper drive mechanism with a reversing wiper motor is known, in which the semicircular driving motion of the motor crank is transmitted to the drive elements of the wipers via a coupling gear. For driving the wiper on the passenger side, the coupling gear is connected via a joint rod to the transversely jointed linkage of a four-bar lever linkage, whose drive shaft and control shaft are supported in a part of the mounting plate, while the wiper on the driver's side is driven via a further joint rod. The joint rods are connected to the coupling gear by means of ball joints, whose ball pegs are disposed coaxially or axially parallel. The wiper motor is secured to the mounting plate via the wiper on the driver's side and the wiper on the passenger side.

A further wiper system is known from German Patent Disclosure DE 199 40 815 A1, in which a first joint rod is pivotably connected to the motor crank and is connected via a crank to a first drive shaft for the wiper on the driver's side. Spaced apart from the joint at the motor crank, a further joint for a second joint rod is provided on the first joint rod. The free end of the second joint rod is connected for driving purposes to a second drive shaft for the wiper on the passenger side via a transversely jointed linkage. The pivotable connection point of the second joint shaft and the pivotable connection point at the crank are spaced apart from one another by a spacing that can be adapted to the conditions in the installation space.

SUMMARY OF THE INVENTION

According to the invention, the wiper motor is disposed as a reversing motor on the passenger side, and its motor shaft is disposed between the second drive shaft and the control shaft on the cast part. The seat for the wiper motor and the two bearing housings for the drive shaft and the control shaft are integrated with the same cast part; as a result, a separate motor mounting plate can be omitted, and an overall compact structure of the mounting plate is obtained. Moreover, the motor shaft of the wiper motor is disposed in the vicinity of the second drive shaft. The slight spacing, at favorable force attack angles, makes a large power takeoff angle or wiping angle of over 115° possible at the drive shaft, an angle that otherwise, given conventional coupling squares and a wiper motor in the form of a revolving motor, necessitates a complicated and expensive transversely jointed linkage. Moreover, between the motor crank and a bearing rocker that is solidly joined to the second drive shaft, a relatively short drive element is the result. This drive element is embodied as a coupling plate and replaces the otherwise usual long joint rod, making the drive mechanism in this region very compact. Compact mechanisms have good kinematic properties, leading to a harmonious course of motion.

In a wiper system with two wiper motors, the other wiper is driven separately by a further wiper motor; the two wiper motors are coupled electrically to one another on the master-slave principle. If the wiper system has only one wiper motor, then the wiper motor is disposed on the passenger side and simultaneously drives a first drive shaft of a wiper on the driver's side. In that case, the motor crank is connected via a first joint to a joint rod, which drives the first drive shaft via a crank and is connected to the coupling plate via a second joint. Depending on the installation space or kinematic conditions, the joints can be disposed coaxially or axially parallel. In addition, both joints can also be disposed on the motor crank and have a spacing from one another.

BRIEF DESCRIPTION OF THE DRAWINGS

Further advantages will become apparent from the ensuing description of the drawing. In the drawing, exemplary embodiments of the invention are shown. The drawing, description and claims include numerous characteristics in combination. One skilled in the art will also expediently consider the characteristics individually and put them together to make useful further combinations.

Shown are:

FIG. 4, a variant of FIG. 1 in a view from below;
FIG. 5, a side view of a wiper system of FIG. 4;
FIG. 6, a wiper system in which each wiper is assigned its own wiper motor;
and
FIG. 7, a wiper system of FIG. 6 in a side view.

DETAILED DESCRIPTION OF THE EXEMPLARY EMBODIMENTS

Figure 1:
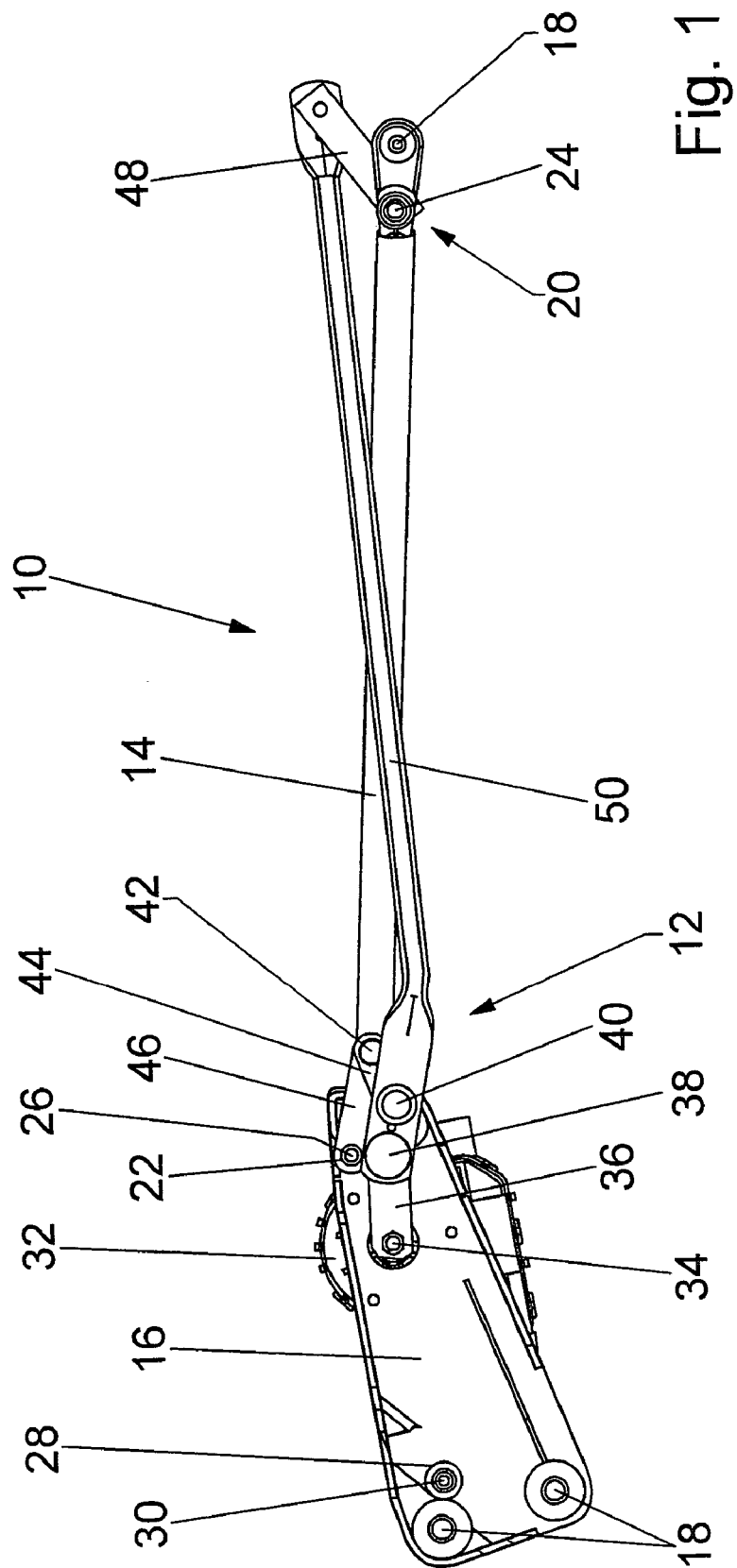
FIG. 1, a wiper system of the invention in a view from below, in a parked position.

The parts essential to the invention of a wiper system 10 for two wipers are shown. A mounting plate 12 includes a mounting plate tube 14, which on one end carries a wiper bearing 20 for a first drive shaft 24 and on the other end is joined to a cast part 16 (FIG. 1). A first bearing housing 22 for a second drive shaft 26 and a second bearing housing 28 for a control shaft 30 are disposed in the cast part 16. A drive lever of a four-bar lever linkage, not shown, is secured in a known manner to the drive shaft 26, while a connecting rod is seated on the control shaft 30. Via fastening eyelets 18 on the wiper bearing 20 and on the cast part 16, the mounting plate 12 is secured to a vehicle body, not shown.

A wiper motor 32, embodied as a reversing motor, is secured to the cast part 16, specifically in such a way that its motor shaft 34 is disposed between the second drive shaft 26 and the control shaft 30; the spacing from the drive shaft 26 is less than from the control shaft 30. A motor crank 36 is seated on the motor shaft 34 and is connected to a joint rod 50 via a first ball joint 38. A crank 48 is pivotably connected to the other end of the joint rod 50 and is connected to a first drive shaft 24 for a wiper on the driver's side. In the region of the first ball joint 38, the joint rod 50 has a second ball joint 40, to which a coupling plate 44 is pivotably connected. The coupling plate is connected on its other end, via a third ball joint 42, to a bearing rocker 46, which is seated on the second drive shaft 26 for a wiper on the passenger side.

Figure 2:
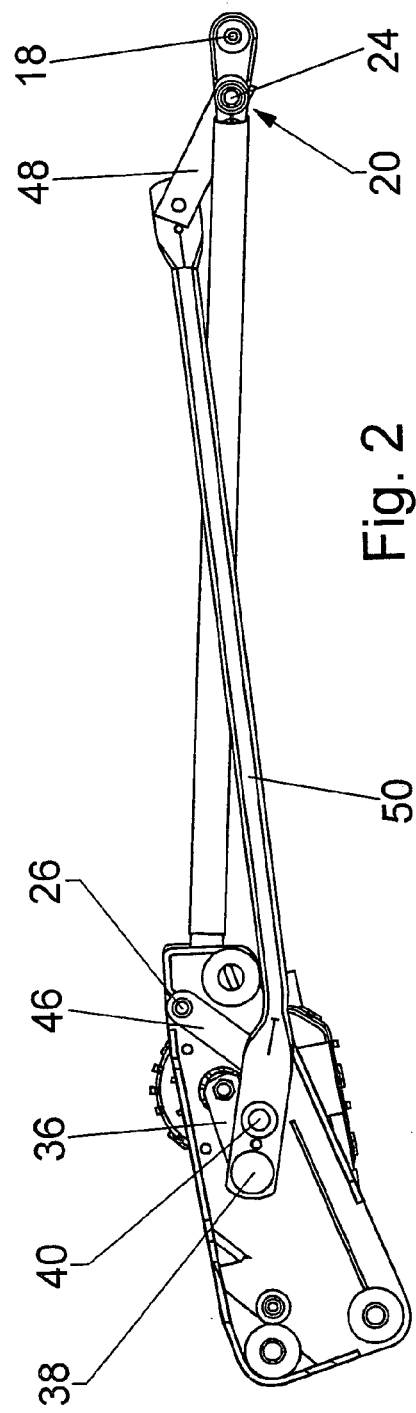
FIG. 2, a wiper system of FIG. 1 at a turning-point position.

The wiper motor 32 is of the reversing type, and the respective turning point positions are shown in FIG. 1 and FIG. 2. A comparison of these two drawings shows that a large power takeoff angle or wiping angle is created at the second drive shaft 26. As a result of this large power takeoff angle and a four-bar lever linkage, not shown in detail, that is disposed following it, a desired reciprocating-pivoting motion is created without requiring additional linkage parts such as a transversely jointed linkage.

Figure 3:
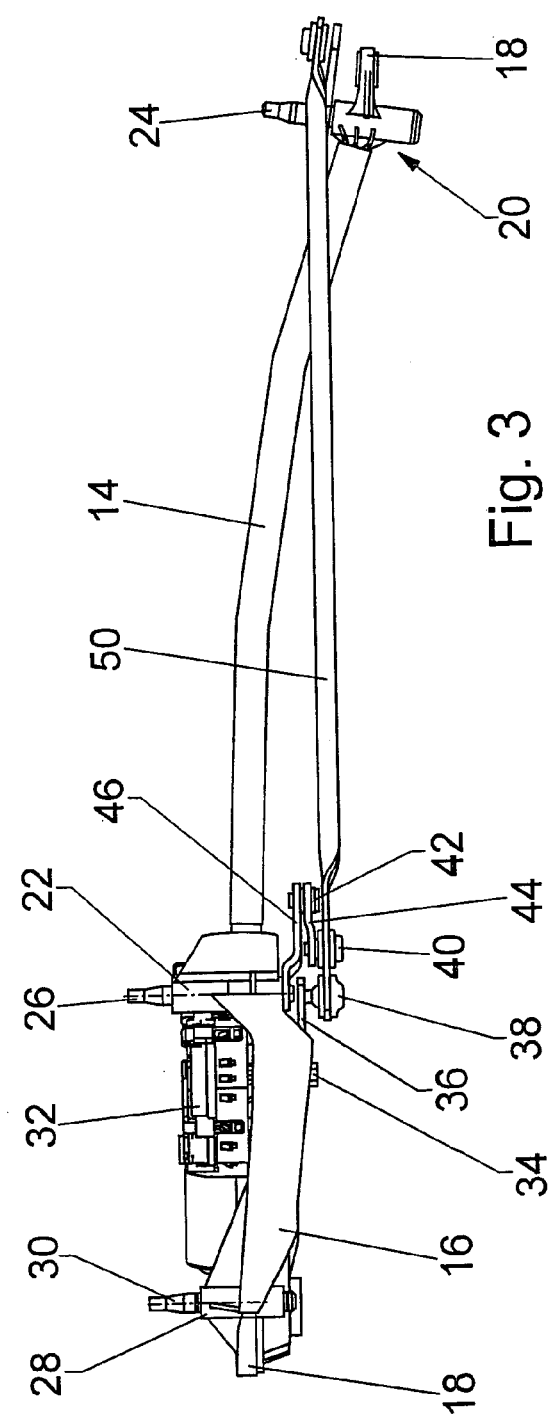
FIG. 3, a side view of the wiper system of FIG. 1.

In an embodiment of the invention, the ball joints 38 and 40 are disposed axially parallel in one plane on the joint rod 50 (FIG. 3). The joint 42 connects the coupling plate 44 to the bearing rocker 46 and is shown in this drawing as a cylinder joint. In the case of flat lever linkages, it is also conceivable for the joint 38 or the joint 40 to be also embodied as a cylinder joint. To create a different curve of motion of the pivot point 40 and thus an altered drive angle, the joints 38 and 40, in one embodiment of the invention, are disposed on the motor crank 36, for instance coaxially (FIG. 4, FIG. 5).

If the wiper system 10 has two wiper motors 32 that each are assigned to one wiper, then the motor shaft 34 of one wiper motor 32 drives the second drive shaft 26 via the motor crank 36, the coupling plate 44, and the bearing rocker 46 (FIG. 6, FIG. 7). In that case, great freedom of design is obtained for the wiper system 10, particularly with a view to its kinematics and the disposition of its component elements.

The invention claimed is:

1. A wiper system (10) having a mounting plate (12), wherein said mounting plate has a mounting plate tube (14), wherein a wiper bearing (20) for a first drive shaft (24) is disposed on the mounting plate tube (14) on one end and a cast part (16) is disposed on the other, and a first bearing housing (22) for a second drive shaft (26) and a second bearing housing (28) for a control shaft (30) of a four-bar lever linkage are integrated with the cast part, and the second drive shaft (26) is driven by a wiper motor (32) via a motor crank (36), a drive element (44), and a bearing rocker (46), wherein the wiper motor (32) is disposed as a reversing motor on a the passenger side, and its motor shaft (34) is disposed on the cast part (16) in the vicinity of the second drive shaft (26), between the second drive shaft (26) and the control shaft (30), and the drive element (44) is embodied as a coupling plate.

2. The wiper system (10) of claim 1, wherein it has two wiper motors (32), of which the motor shaft (34) of one wiper motor drives the second drive shaft (26), via the motor crank (36), the coupling plate (44), and the bearing rocker (46), while the other wiper motor is associated with the first drive shaft (24).

3. The wiper system (10) of claim 1, wherein the motor crank (36) is connected via a first joint (38) to a joint rod (50), which drives the first drive shaft (24) via a crank (48), and is connected to the coupling plate (44) via a second joint (40).

4. The wiper system (10) of claim 3, wherein the joints (38, 40) are disposed next to one another in the same plane.

5. The wiper system (10) of claim 3, wherein the joints (38, 40) are disposed coaxially.

6. The wiper system (10) of claim 3, wherein at least one joint (38, 40) is embodied as a ball joint, and the other is embodied as a cylinder joint.

* * * * *